United States Patent
Nie

(10) Patent No.: US 7,327,755 B2
(45) Date of Patent: Feb. 5, 2008

(54) METHOD AND DEVICE FOR STORING DATA PACKETS

(75) Inventor: Xiaoning Nie, München (DE)

(73) Assignee: Infineon Technologies AG, Munich (DE)

( * ) Notice: Subject to any disclaimer, the term of this patent is extended or adjusted under 35 U.S.C. 154(b) by 986 days.

(21) Appl. No.: 10/128,207

(22) Filed: Apr. 23, 2002

(65) Prior Publication Data

US 2002/0188742 A1 Dec. 12, 2002

(30) Foreign Application Priority Data

Apr. 23, 2001 (DE) ................................ 101 19 754

(51) Int. Cl.
*H04J 3/16* (2006.01)

(52) U.S. Cl. .................... 370/466; 370/395.1; 370/412

(58) Field of Classification Search ..................... None
See application file for complete search history.

(56) References Cited

U.S. PATENT DOCUMENTS

| | | | |
|---|---|---|---|
| 5,603,002 A * | 2/1997 | Hashimoto | 711/113 |
| 5,778,414 A * | 7/1998 | Winter et al. | 711/5 |
| 5,793,953 A | 8/1998 | Yeung et al. | |
| 6,078,733 A * | 6/2000 | Osborne | 709/250 |
| 6,148,082 A | 11/2000 | Slattery et al. | |
| 6,442,662 B1 * | 8/2002 | Komatsu | 711/202 |
| 6,680,938 B1 * | 1/2004 | Hammermeister et al. | 370/360 |
| 6,697,366 B1 * | 2/2004 | Kim | 370/392 |
| 2002/0144073 A1 * | 10/2002 | Trainin et al. | 711/170 |

FOREIGN PATENT DOCUMENTS

WO      WO 99/65193       12/1999

* cited by examiner

*Primary Examiner*—Duc Ho
(74) *Attorney, Agent, or Firm*—Peter F. Corless; Steven M. Jensen; Edwards Angell Palmer & Dodge LLP

(57) ABSTRACT

To enable data packets, which can be present in different data transmission formats and which are to be routed in a communication network, to be stored as simply and effectively as possible, it is proposed in accordance with the invention to generate for each data packet to be stored a descriptor (8) having a special data structure, the descriptor (8) comprising, in particular, a data field (14) with a pointer array. The data of the data packet to be stored are stored in a memory (1) which comprises a multiplicity of memory blocks (7) of the same size. The pointer array of the descriptor (8) points to the start addresses of the memory blocks (7) needed for storing the data packet.

28 Claims, 2 Drawing Sheets

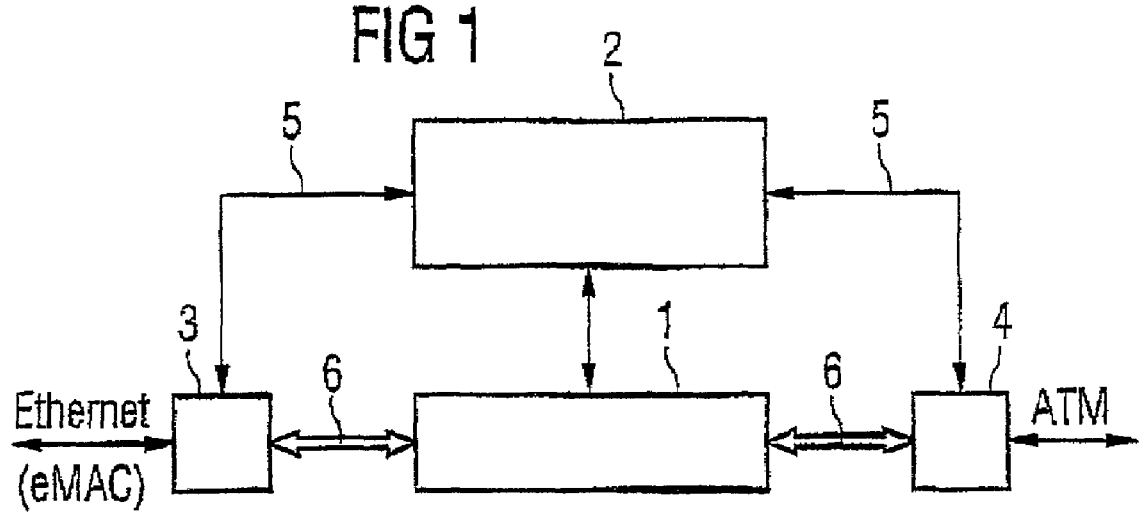
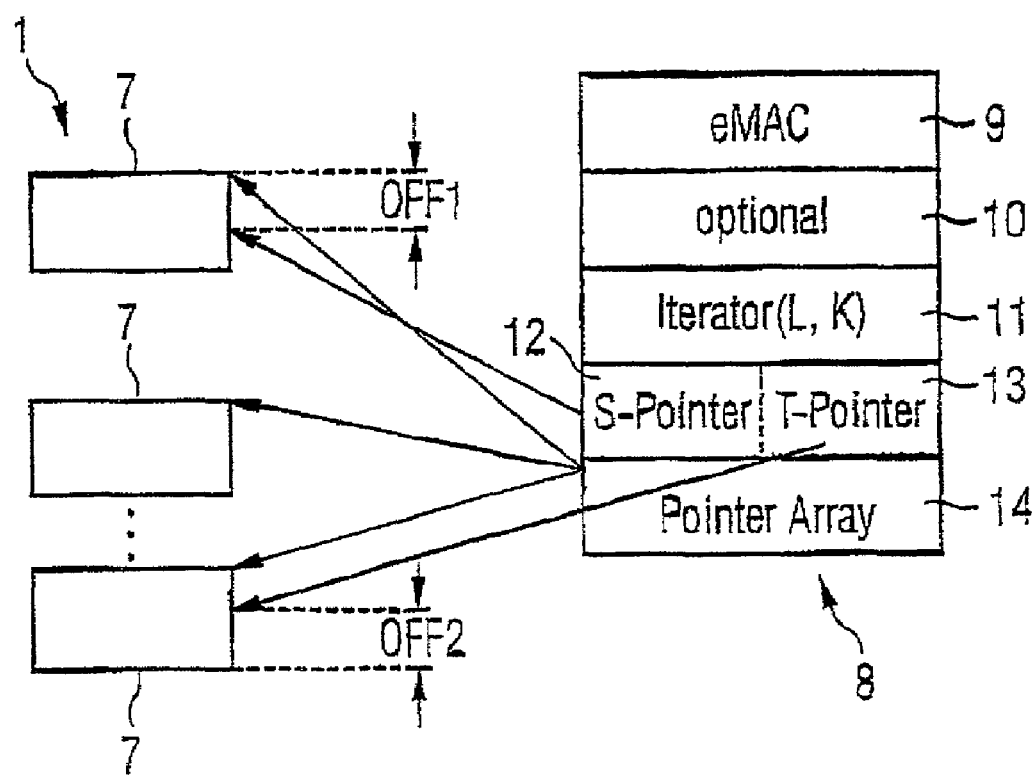

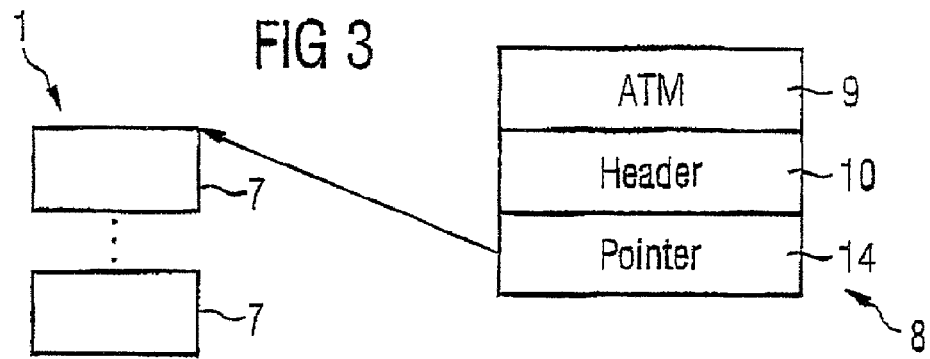
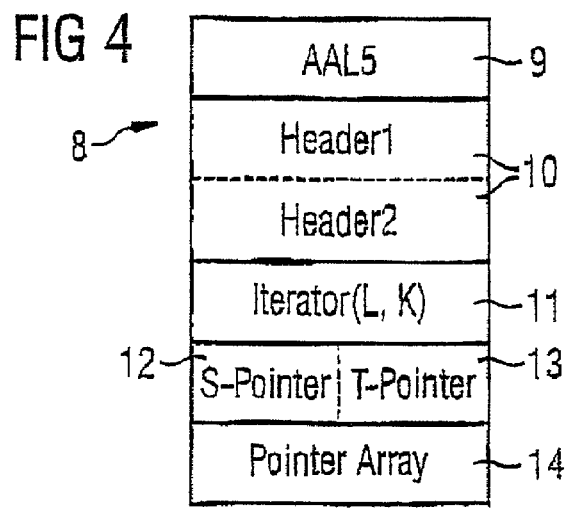
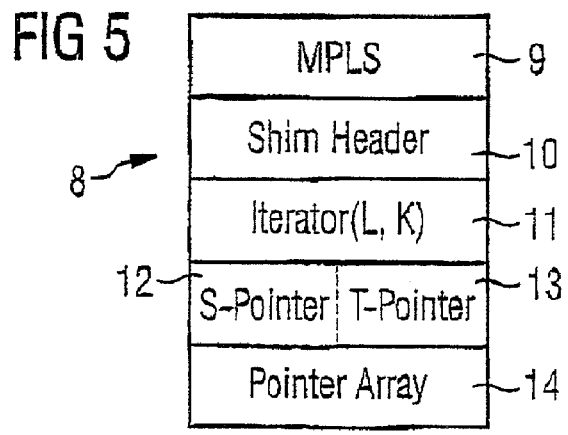

METHOD AND DEVICE FOR STORING DATA PACKETS

BACKGROUND OF THE INVENTION

The present invention relates to a method and to a correspondingly arranged device for storing message or data packets which are present in a particular data transmission format and are to be transmitted or, respectively, routed from a transmitter to a desired receiver in a communication network.

To transmit or route messages, the messages are split into a number of units or data packets in modern telecommunication networks. Each of these data packets is usually provided with a header and a payload field which contains the actual message or payload. In addition, a trailer can be provided as termination of the respective data packet.

As a rule, the information required for routing a data packet is contained in the header of the respective data packet. An Ethernet data packet transmitted, for example, in a MAC (Medium Access Control) frame (which, for the sake of simplicity, will be called eMAC data packet in the text which follows), exhibits, e.g., in the header the source address and the destination address of the message to be transmitted. The destination address of the data packet is analysed at each node of the corresponding communication network in order to determine in dependence thereon the best possible routing path to the desired receiver.

An eMAC data packet also comprises an IP (Internet Protocol) packet and such an IP packet can comprise up to 60 000 bytes. In the switching node of a communication network, the problem may occur that an incoming data packet present in a particular data packet format must be mapped to one or more data packets of another data packet format at the output end. While Ethernet routing is preferably applied in local area networks, ATM (Asynchronous Transfer Mode) routing is used, for example, in more modern broadband ISDN (Integrated Services Digital Network) communication networks. In ATM routing, the messages to be transmitted are transmitted in the form of constant-length data packets, so-called ATM cells and the ATM cells are routed by means of identifiers in the headers. A peculiarity of ATM routing is the fact that each ATM cell always comprises 53 bytes and is composed of a header with 5 bytes and a payload field with 48 bytes. In a switching node of a communication network which exhibits both an eMAC or IP interface and an ATM interface, the problem is, therefore, to map the data of an incoming IP packet which can comprise up to 60 000 bytes to the relatively short ATM cells at the output end, which can in each case only comprise 48 bytes of payload.

In switching nodes or switching facilities such as, e.g. routers or switches, it is therefore necessary to temporarily store the data of an incoming data packet in a buffer. Since it is predominantly the routing information contained in the headers of the individual data packets which is of significance for the routing of data packets in communication networks, the header, as a rule, is processed via a fast data path while the much more extensive payload of the information field of an incoming data packet may have to be subjected to extremely extensive data processing involving the aforementioned temporary storage in order to enable mapping to the desired data transmission format at the output end to be performed.

SUMMARY OF THE INVENTION

There is a basic requirement for a method and a correspondingly arranged device by means of which data packets of different data transmission formats can be stored as simply as possible, that is to say with the least possible memory requirement and the fewest possible memory accesses.

According to the invention, this object is achieved by a method and a device for storing data packets.

According to the invention, it is intended to use a memory which is subdivided into a multiplicity of memory blocks of the same size for storing the data of a data packet, particularly the payload data of a data packet. For each data packet to be stored, a descriptor is generated which comprises a data field which designates, in the form of pointers, the start addresses of the memory blocks occupied by the respective data packet, the data of a data packet to be stored being stored by using this descriptor.

The descriptor is advantageously preferably built up out of 32 bit data words/data fields.

In addition, the descriptor can also comprise a data field which designates the type of data packet to be stored or, respectively, the corresponding data transmission format. In addition, the descriptor can comprise a data field which provides information on the number of memory blocks of the memory occupied by the respective data packet. In this respect, an iterator can be used which, on the one hand, designates the total number of memory blocks occupied by the data packet and, on the other hand, contains a run variable which is incremented with the respective memory block used during the storing of the respective data packet.

During the storing of the data of a data packet, each memory block can be described, beginning with its start address and/or ending with its end address. In addition, however, it is possible for each memory block to be described beginning with a particular address offset referred to its start address and/or up to a particular address offset referred to its end address. For this purpose, the descriptor used during the storing of the data of a data packet can have a pointer which points to the address of a memory block at which storing is to be actually begun. Similarly, the descriptor can have a pointer which points to the address of a memory block up to which the data are to be actually written into the respective memory block.

By using the data structure proposed according to the invention and the descriptor proposed according to the invention, the processing of the data of the data packet to be stored can be decoupled from the physical storing process. Using a memory with memory blocks of fixed or identical memory capacity ensures that it is always only the total memory capacity of the memory which can be variably reserved which is actually needed for storing the respective data packet. Thus, data packets of different length or different extent can be stored in one and the same memory without problems. Using a pointer array provides for simpler processing of the data and simpler addressing of the memory blocks needed. In addition, the release of memory blocks which are no longer needed becomes simpler (garbage collection).

The present invention is generally suitable for processing and storing data packets of different data transmission formats such as, for example, eMAC, IP, MPLS (Multi Protocol Label Switch) or AAL5 data packets.

It is particularly advantageous if the memory capacity of the individual memory blocks of the memory used for storing the data packets has a capacity which corresponds to the extent of the payload field of an ATM cell and thus comprises 48 bytes. In this case, the payload of an ATM cell can be stored already in a single memory block which distinctly simplifies the structure of the descriptor needed.

The invention is generally suitable for use in all fields of application where data packets are to be stored, particularly data packets with different data transmission formats, and the present invention can be used, in particular, in telecommunication switching systems such as, e.g. in the form of network processors on so-called line cards for switches or routers. In particular, the present invention is suitable for use in telecommunication switching systems which have interfaces for different data transmission formats such as, for example, via an Ethernet, IP, MPLS or ATM interface in order to map the data of a data packet received with a particular transmission format to at least one data packet having a different data transmission format which is to be routed to the desired receiver.

BRIEF DESCRIPTION OF THE DRAWINGS

In the text which follows, the present invention is described in greater detail by means of preferred exemplary embodiments and referring to the drawing, in which:

FIG. 1 shows a simplified block diagram of a telecommunication switching system with a device according to the invention for storing the data of data packets of different data transmission formats, FIG. 2 shows a possible structure of a descriptor used according to the invention for storing an eMAC data packet, FIG. 3 shows a representation for explaining the structure of a descriptor used according to the invention for storing an ATM cell, FIG. 4 shows a representation for explaining the structure of a descriptor used according to the invention for storing an AAL5 data packet, and FIG. 5 shows a representation for explaining the structure of a descriptor used according to the invention for storing an MPLS data packet.

DETAILED DESCRIPTION OF THE INVENTION

FIG. 1 shows, in the form of a greatly simplified block diagram, the structure of a device according to the invention which can be used, for example, in a router or switch of a telecommunication network. A significant component is a buffer 1 in which the data of a data packet received via a line unit 3 or 4 are temporarily stored. In the exemplary embodiment shown, it is assumed that the line unit 3 defines an interface with an Ethernet communication network, particularly to an MAC frame Ethernet (eMAC) communication network whereas line unit 4 defines an interface to an ATM communication system, i.e. data packets according to the eMAC data transmission format are received or transmitted, respectively, via line unit 3 and data packets according to the ATM data transmission format are received or, respectively, transmitted via line unit 4.

The memory access to the memory 1 is controlled by a control unit 2, the control unit 2, in particular, being responsible for temporarily storing the data of an incoming data packet in the memory 2 and then transferring it into the data transmission format of an outgoing data packet. For this purpose, the control unit 2 communicates with the line units 3 and 4 via bidirectional data paths 5. In addition, a fast bidirectional data path 6, which is used for accelerated and prioritized processing of the information contained in the header of a received data packet, is provided between line units 3, 4 and memory 1. As has already been explained, the information contained in the header of a data packet is predominantly used for routing the respective data packet to the desired receiver so that this information is of higher-level significance and, accordingly, must be processed with priority in order to be able to determine the suitable routing paths. The payload contained in the payload field of the respective data packet is temporarily stored essentially unchanged in the memory 1 by means of access via the data paths 5 by the control unit 2 whereas the information contained in the header of the data packet is forwarded via the faster data path 6 and memory 1 after appropriate data processing by the control unit 2.

During the temporary storage of the data of a received data packet, particularly of the payload data of a received data packet, the control unit 2 uses a special data structure in the form of a descriptor, the basic structure of the descriptor being essentially uniform for the different data transmission formats. Nevertheless, the descriptor can have slight deviations in dependence on the data transmission format of the data packet to be stored, i.e. in dependence on the type of data packet to be stored.

During the reception of a data packet to be stored, a special function of the control unit 2 by means of which a descriptor suitable for describing this data packet is generated and the parameters contained in the descriptor are correspondingly set, is activated in dependence on the type of this data packet. Using the descriptor thus generated, the data of the corresponding data packet are subsequently temporarily stored in the memory 1 by the control unit 2. After a received data packet has been processed in the manner described above, the descriptor can be updated for processing a further data packet of the same type. If no data packet of the same type is available for processing, the descriptor is preferably deleted in order to release memory space which is needed for storing the descriptors. The descriptors can also be stored, for example, in the memory 1 or directly in the control unit 2.

In the text which follows, preferred exemplary embodiments of the structure of descriptors for describing different data packet types are explained, referring to FIG. 2-FIG. 5.

As shown in FIG. 2, the memory 1 which is intended for temporarily storing the data of a data packet, is subdivided into a multiplicity of memory blocks 7 of the same size. Similarly, FIG. 2 shows a possible structure for a descriptor 8 for describing an eMAC data packet. The connection or correlation between the data of the data packet to be stored and the memory blocks 7 of the memory 1 needed for storing these data is established with the aid of the descriptor.

The descriptor 8 shown in FIG. 2 comprises a data field or, respectively, data word 9 which designates the type of the respective data packet, the type "eMAC" in the present case. In addition, the data word 9 can also contain information which provides information about the extent of the data to be stored or, respectively, the data packet size and a distinction can be made, for example, between two different data packet sizes. This information can be of use for reserving or releasing the memory 1 block by block.

A further data word 10 of the descriptor 8 can be optionally occupied or used in dependence on the type of the respective data packet (for example for storing header information). In the case of an eMAC data packet, the data word 10 is not occupied by any information in the present case.

In addition, the descriptor 8 comprises a data word 11 which comprises an iterator with a parameter L and a run variable K. The parameter L designates the total number of memory blocks 7 which are needed for storing the data of the respective data packet. The run variable K, in contrast, designates the memory block 7 currently used in each case for storage, i.e. the run variable K is changed or incremented with each change of memory block 7. The number of memory blocks 7 needed is reserved in dependence on the value of the parameter L.

An essential component of the descriptor 8, which is preferably organized in 32 bits, is a data field 14 in which a pointer array with pointers to the start addresses of the L memory blocks 7 needed is stored. The data field 14 thus contains a list of pointers which point to the start addresses of the memory blocks 7 which are needed for storing the respective data packet. The data field 14 thus comprises L different pointers in accordance with the value of the parameter L contained in the data field 11.

During the storing of the data of a data packet, they can be progressively written into the individual memory blocks 7 beginning at the start address of the first memory block 7, by using the descriptor 8 shown, the memory blocks 7 being loaded completely in each case. However, it is also possible, instead, to load the data beginning with a particular address offset OFF1 referred to the start address of the first memory block 7 up to a certain address offset OFF2 referred to the end address of the last memory block 7. For this purpose, the descriptor 8 shown in FIG. 2 comprises a data field 12 with a reference to the address of the first memory block 7 at which the writing-in of the data is actually to begin so that the information contained in the data field 12 can also be designated as start pointer or S-pointer. Correspondingly, the descriptor 8 in the exemplary embodiment shown in FIG. 2 comprises a data field 13 with a reference to the address of the last memory block 7 up to which the data are to be actually written into the memory 1 so that the information contained in the data field 13 can also be called trailer pointer or T-pointer. The S-pointer described by the data field 12 thus defines the address offset OFF1 while the T-pointer described by the data field 13 defines the address offset OFF2. Naturally, it is also conceivable that the S-pointer and the T-pointer are not referred to the first and last memory block 7 of the memory 1 but jointly refer to one and the same memory block 7 so that when the data of a data packet are stored, the data are always written into the individual memory blocks 7 with an offset OFF1 or an offset OFF2, respectively.

The structure of the descriptor 8 shown in FIG. 2 is also suitable, for example, for storing an Ethernet CPCS (Common Part Convergence Sublayer) data packet. This is an intermediate format which is used, for example, for ATM segmenting.

The size of the individual memory blocks 7 of the memory 1 used for temporary storage of the data is not specified, in principle. In particular, it is also conceivable that each memory block 7, in turn, is allocated to a number of memory elements of smaller size. It is particularly advantageous, however, if the memory blocks 7 have a memory capacity which is sufficient for storing the smallest possible data packet type. Thus, the memory capacity of the memory blocks 7 can be selected, for example, in such a manner that each memory block 7 can completely store the data of an ATM cell (53 bytes) or at least the payload data of an ATM cell (48 bytes) since ATM cells are the shortest data packets which, moreover, always have the same structure.

If the memory capacity of the individual memory blocks 7 is selected to be 48 bytes, a descriptor 8 having a particularly simple structure can be used for describing an ATM cell or an ATM data packet, respectively, as shown in FIG. 3. The descriptor 8 shown in FIG. 3 again comprises a data word 9 (which, for example, can comprise 32 bits analogously to the other exemplary embodiments described) in order to describe the type of the respective data packet. In addition, the data field 14 which, according to FIG. 2, is occupied by a pointer array, is reduced to only a single pointer which points to the start address of the memory block 7 needed for storing the corresponding ATM cell since one memory block is sufficient for storing the payload data of an entire ATM cell due to the selected size of the memory blocks 7. In addition, the data field 10 of the descriptor 8 is occupied with the information contained in the header of the respective ATM cell, according to FIG. 3. The separate storage of the header information of the ATM cell in the descriptor 8 is appropriate since this information is of primary significance for routing the ATM cell as has already been described. Naturally, however, the exemplary embodiment shown in FIG. 3 can also be modified in such a manner that the memory block 7 comprises 53 bytes so that both the header data and the payload data of a single ATM cell can be stored in the memory block 7 and the data field 10 can remain unused in this case. The correct format of the descriptor is recognized via the data field 9 which designates the type.

In an ATM-based communication network, transmission and routing of the ATM cells basically takes place independently of the respective application. The required flexibility of ATM communication networks with respect to different communication processes such as, for example, audio, video or data communication, arises from the functions of a special ATM adaptation layer, also called AAL layer. The functions of the AAL layer are dependent on application with respect to the bit rate (constant or variable), the type of communication (connection-oriented or connectionless) etc. A distinction is made between different service categories or AAL types independently of the function of the AAL layer. Service category AAL5, for example, supports the layer VBR (Variable Bit rate) data traffic typical of data communication, both connectionless and connection-oriented communication being possible.

In practice, an AAL5 data transmission is used, for example, for the connectionless case in an ATM communication between local area networks (LANs), the AAL5 service category or AAL5 service type being suitable, in particular, for dividing the data of an IP packet over a number of ATM cells. It is typical in this application that the ATM cells allocated to an IP packet all have the same header, only the last ATM cell having a header which differs from this. Accordingly, a descriptor 8 with the structure shown in FIG. 4 is suitable for this scenario, for example, the data word 9 describing the type "AAL5". The data field 10 optionally used according to FIG. 2 is divided in the exemplary embodiment shown in FIG. 4 and describes, on the one hand, the header of the last ATM cell (header 2) and, on the other hand, the header of all remaining ATM cells (header 1). The data fields or data words 11-14 are occupied analogously to FIG. 2. It is advantageous that only one descriptor 8 can be used for all the ATM cells which are allocated to an AAL5 frame or an AAL5 CPCS frame, respectively.

FIG. 5 shows a possible structure of the descriptor 8 for describing an MPLS (Multi Protocol Label Switching) data packet. MPLS integrates IP and ATM by combining layer-2 functions (ATM switching) with layer-3 functions (IP routing). For this purpose, an MPLS data packet comprises an IP data packet which is provided with a special 32-bit header, also called "shim header". This shim header comprises a 20-bit label which is used for routing/switching the corresponding data packet in contrast, only the destination address is evaluated with pure IP routing. Other bits of the shim header designate, for example, the quality of service, i.e. it is specified, for example, if important video data or less important audio data are transmitted, etc.

The IP packet contained in an MPLS data packet is structured in accordance with the normal IP protocol.

To describe such an MPLS data packet, the descriptor 8 shown in FIG. 5 again comprises a data field or data word 9 which designates the type of the data packet. In the exemplary embodiment shown, the data field 10 is occupied by the information of the shim header described above. The data fields 11-14 are occupied analogously to the exemplary embodiments shown in FIG. 2 and FIG. 4 so that reference can be made to the preceding explanations in this regard.

The invention claimed is:

1. Method for storing data packets, the data of a data packet present in a particular data transmission format being stored in a memory which is subdivided into memory blocks of the same size, in which the data packet to be stored is associated with a descriptor which comprises a data field with a reference to the start addresses of the memory blocks of the memory in which the data of the data packet are to be stored, and in which the data of the data packet are stored in the memory by using the descriptor.

2. Method according to claim 1 wherein the descriptor comprises a data field which describes the data transmission format of the data packet to be stored.

3. Method according to claim 1 wherein the descriptor comprises a data field which describes an address offset with respect to the start address of a memory block in which the data of the data packet are to be stored, the data of the data packet being written into the corresponding memory block beginning at this address offset.

4. Method according to claim 1 wherein the descriptor comprises a data field which describes an address offset with respect to the end address of a memory block into which the data of the data packet are to be written, the data of the data packet being written into the corresponding memory block up to this address offset.

5. Method according to claim 1 wherein the descriptor comprises a data field which, on the one hand, describes the number of memory blocks of the memory, which are needed for storing the data of the data packet, and, on the other hand, exhibits a run variable which is changed with each memory block of the memory during the storing of the data and thus in each case designates the memory block currently being loaded in the memory.

6. Method according to claim 1 wherein the data packet to be stored comprises a header and a payload field which exhibits a payload, the payload contained in the payload field being stored in the memory with the aid of the method.

7. Method according to claim 1 wherein a data packet present in an Ethernet data transmission format is stored with the aid of the method.

8. Method according to claim 1 wherein a data packet present in an Ethernet CPCS data transmission format is stored with the aid of the method.

9. Method according to claim 1 wherein a data packet present in an ATM data transmission format is stored with the aid of the method.

10. Method according to claim 9 wherein the data field of the descriptor, which points to the start addresses of the needed memory blocks of the memory, only exhibits a reference to the start address of a single particular memory block of the memory for the data packet present in the ATM data transmission format.

11. Method according to claim 1 wherein the memory blocks of the memory in each case exhibit a storage capacity which is sufficient for storing the data of a data packet present in an ATM data transmission format.

12. Method according to claim 11 wherein the memory blocks of the memory in each case have a storage capacity of 48 bytes in order to be able to store completely in each case the payload contained in a payload field of the data packet present in the ATM data transmission format.

13. Method according to claim 12 wherein the payload contained in the payload field of the data packet present in the ATM data transmission format is stored in the particular memory block by using the data field of the descriptor pointing to the start address of the particular memory block, and that the descriptor for the data packet present in the ATM data transmission format comprises a data field for designating the data contained in the header of the data packet.

14. Method according to claim 1 wherein the data of a data packet present in an AAL5 data transmission format are stored with the aid of the method.

15. Method according to claim 14 wherein the data of a data packet present in an IP data transmission format are mapped to a number of data packets present in an ATM data transmission format by using the AAL5 data transmission format, each data packet present in the ATM data transmission format comprising a header and a payload field exhibiting a payload, and that the descriptor for the AAL5 data transmission format comprises a data field for designating the header of the last data packet in time which is present in the ATM data transmission format, and the header of all other data packets which are present in the ATM data transmission format.

16. Method according to claim 1 wherein the data of a data packet present in an MPLS data transmission format are stored with the aid of the method.

17. Method according to claim 1 wherein the data packet to be stored exhibits a header and a payload field with a payload, and that the payload contained in the payload field is stored in the memory by using the descriptor, with the aid of the method, the descriptor comprising a data field for describing the header of the respective data packet.

18. Method according to claim 1 wherein the data of the data packet which is present in a first data transmission format are temporarily stored in the memory by using the descriptor and are then converted to at least one data packet having a second data transmission format which is different from the first data transmission format and are forwarded to a desired receiver.

19. Device for storing data packets, a data packet to be stored being present in a particular data transmission format, comprising a memory which is subdivided into a multiplicity of memory blocks of the same size, and a control device for generating a descriptor which is allocated to the data packet to be stored, the descriptor exhibiting a data field which points to the start addresses of the memory blocks of the memory which are needed for storing the data of the data packet, the control device being arranged for storing the data of the data packet in the memory by using the descriptor.

20. Device according to claim 19 wherein the device is a component of a telecommunication switching system.

21. The device of claim 19, wherein the descriptor comprises a data field which describes the data transmission format of the data packet to be stored.

22. The device of claim 19, wherein the descriptor comprises a data field which describes an address offset with respect to the start address of a memory block in which the data of the data packet are to be stored, the data of the data packet being written into the corresponding memory block beginning at this address offset.

23. The device of claim 19, wherein the descriptor comprises a data field which describes an address offset with respect to the end address of a memory block into which the data of the data packet are to be written, the data of the data packet being written into the corresponding memory block up to this address offset.

24. The device of claim 19, wherein the descriptor comprises a data field which, on the one hand, describes the number of memory blocks of the memory, which are needed for storing the data of the data packet, and, on the other hand, exhibits a run variable which is changed with each memory block of the memory during the storing of the data and thus in each case designates the memory block currently being loaded in the memory.

25. The device of claim 19, wherein the memory blocks of the memory in each case exhibit a storage capacity which is sufficient for storing the data of a data packet present in an ATM data transmission format.

26. The device of claim 25, wherein the memory blocks of the memory in each case have a storage capacity of 48 bytes in order to be able to store completely in each case the payload contained in a payload field of the data packet present in the ATM data transmission format.

27. The device of claim 19, wherein the data packet to be stored exhibits a header and a payload field with a payload, and that the payload contained in the payload field is stored in the memory by using the descriptor, with the aid of the method, the descriptor comprising a data field for describing the header of the respective data packet.

28. A method for storing data packets, comprising:
providing data of a data packet in a particular data transmission format stored in a memory which is subdivided into memory blocks of the same size,
associating the data packet to be stored with a descriptor which comprises a data field with a reference to the start addresses of the memory blocks of the memory in which the data of the data packet are to be stored, and
storing the data of the data packet in the memory by using the descriptor.

* * * * *